US010496378B2

(12) United States Patent
Li et al.

(10) Patent No.: US 10,496,378 B2
(45) Date of Patent: Dec. 3, 2019

(54) GENERATING AND EXECUTING MULTI-ENTRY POINT FUNCTIONS

(71) Applicant: Microsoft Technology Licensing, LLC, Redmond, WA (US)

(72) Inventors: Zhongyuan Li, Redmond, WA (US); Tianzhuang Dou, Redmond, WA (US); Lei Kou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/587,222

(22) Filed: May 4, 2017

(65) Prior Publication Data
US 2018/0321917 A1 Nov. 8, 2018

(51) Int. Cl.
*G06F 9/44* (2018.01)
*G06F 8/30* (2018.01)

(52) U.S. Cl.
CPC ...................... *G06F 8/30* (2013.01)

(58) Field of Classification Search
CPC ........................................................ G06F 8/30
USPC ........................................................ 717/106
See application file for complete search history.

(56) References Cited

U.S. PATENT DOCUMENTS

| | | | | |
|---|---|---|---|---|
| 5,836,014 A * | 11/1998 | Faiman, Jr. | ............. | G06F 8/433 717/147 |
| 6,427,231 B1 * | 7/2002 | Burke | ...................... | G06F 9/449 717/116 |
| 6,708,330 B1 * | 3/2004 | Moberg | .............. | G06F 9/44521 711/118 |
| 7,836,504 B2 | 11/2010 | Ray et al. | | |
| 9,280,333 B1 | 3/2016 | Gschwind et al. | | |
| 9,443,083 B2 | 9/2016 | Ignatchenko et al. | | |
| 9,516,057 B2 | 12/2016 | Aziz | | |
| 2006/0288412 A1 | 12/2006 | Arnold et al. | | |

(Continued)

FOREIGN PATENT DOCUMENTS

WO 2012041385 A1 4/2012

OTHER PUBLICATIONS

Aaron Krauss, "Programming Concepts: Static vs. Dynamic Type Checking", Nov. 20, 2015, https://thesocietea.org/2015/11/programming-concepts-static-vs-dynamic-type-checking/ (Year: 2015).*

(Continued)

*Primary Examiner* — Wei Y Zhen
*Assistant Examiner* — Lanny N Ung
(74) *Attorney, Agent, or Firm* — Goff IP Law PLLC; Jared Goff

(57) ABSTRACT

A static multi-entry point function with more than one entry point is provided. The function allows callers to enter the function at different entry points using an offset. Each entry point of the function is associated with a different offset, and includes instructions that identify data that is associated with the entry point. Each entry point further includes an instruction that jumps to a common prologue of the function. The common prologue loads the identified data into local variables. The function also includes a functional component that performs different actions depending on the data in the local variables. The function includes a default entry point that is used when the function is called without any offset, so that the function appears to behave like a normal function to scanners.

20 Claims, 5 Drawing Sheets

(56) References Cited

U.S. PATENT DOCUMENTS

2011/0041183 A1* 2/2011 Myles .................. G06F 21/14
726/26
2016/0124850 A1 5/2016 Gschwind et al.
2016/0328561 A1 11/2016 Tamir et al.

OTHER PUBLICATIONS

"Bypassing Anti-Virus Scanners", https://dl.packetstormsecurity.net/papers/bypass/bypassing-av.pdf, Retrieved on: May 5, 2017, 24 pages.
Hatem, et al., "Malware Detection in Cloud Computing", In International Journal of Advanced Computer Science and Applications, vol. 5, No. 4, 2014, pp. 187-192.
"International Search Report and Written Opinion Issued in PCT Application No. PCT/US2018/028224", dated Jul. 19, 2018, 18 Pages.
Kinder, Johannes, "Static Analysis of x86 Executables", Accessed at <<http://www.cs.rhul.ac.uk/home/kinder/papers/phdthesis.pdf>>, Accessed on Sep. 13, 2018, Dissertation Submitted on Sep. 24, 2010, 199 Pages.

\* cited by examiner

GENERATING AND EXECUTING MULTI-ENTRY POINT FUNCTIONS

BACKGROUND

In certain circumstances, software functions or applications may desire to behave differently based on who or what is calling the function. For example, a user may desire to create a monitoring function that is called by certain applications to collect statistics or other information about each application. Because each application is different and has different usage scenarios and characteristics, the user may desire that the monitoring function collect different statistics and behave differently based on which application is calling the monitoring function. However, a static monitoring function may not be aware of which application is calling it, making such application tailored behavior difficult.

One solution to this problem is the use of dynamic functions. For dynamic functions, the code is generated when the functions are called, and therefore the code can be tailored at runtime to the particular calling application or function.

However, there are drawbacks associated with dynamic code. First, generating dynamic code at runtime requires a code generation engine, which can be large and may require increased memory and processing resources when compared to static code. Second, dynamically generated code may not be as stable as static code, and therefore may lead to a diminished experience for the end user.

SUMMARY

A static multi-entry point function with more than one entry point is provided. The function allows callers to enter the function at different entry points using an offset. Each entry point of the function is associated with a different offset, and includes instructions that identify data that is associated with the entry point. Each entry point further includes an instruction that jumps to a common prologue of the function. The common prologue loads the identified data into local variables. The function also includes a functional component that performs different actions depending on the data in the local variables. The function includes a default entry point that is used when the function is called without any offset, so that the function appears to behave like a normal function to scanners.

In an implementation, a system for providing a multi-entry point function is provided. The system includes at least one computing device and a multi-entry point function engine. The multi-entry point function engine is adapted to generate a multi-entry point function, wherein the multi-entry point function comprises a plurality of entry points wherein each entry point is associated with data, and a functional component that performs one or more actions based on the data associated with a selected entry point of the plurality of entry points. The multi-entry point function engine is further adapted to receive a call for the multi-entry point function, the call associated with an indication of an entry point of the plurality of entry points, and execute the generated multi-entry point function based on the indicated entry point.

In an implementation, a system for providing a multi-entry point function is provided. The system includes at least one computing device, and a multi-entry point function engine. The multi-entry point function is adapted to: generate an index, wherein the index comprises a plurality of elements; and generate a multi-entry point function, wherein the multi-entry point function comprises: a plurality of entry points, wherein each entry point is associated with an element of the plurality of elements of the index; a common prologue that comprises: an instruction that creates a stack frame for the multi-entry point function; and an instruction that saves an identifier of a selected entry point of the plurality of entry points to the stack frame; and a functional component that comprises: an instruction to determine the selected entry point based on the identifier; an instruction to save the data from the element associated with the selected entry point as one or more local variables; and an instruction to perform one or more actions based on the data from the one or more local variable.

In an implementation, a method for executing a multi-entry point function is provided. The method includes: receiving a call for a multi-entry point function by a computing device, wherein the multi-entry point function comprises: a plurality of entry points, wherein each entry point is associated with an element of a plurality of elements of an index; a common prologue that comprises: an instruction to read data from the element associated with a selected entry point of the plurality of entry points; and an instruction to save the data from the element associated with the selected entry point as one or more local variables; and a functional component that comprises an instruction to perform one or more actions based on the data from the one or more local variables; determining an offset associated with the call by the computing device; and executing the generated multi-entry point function based on the determined offset by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
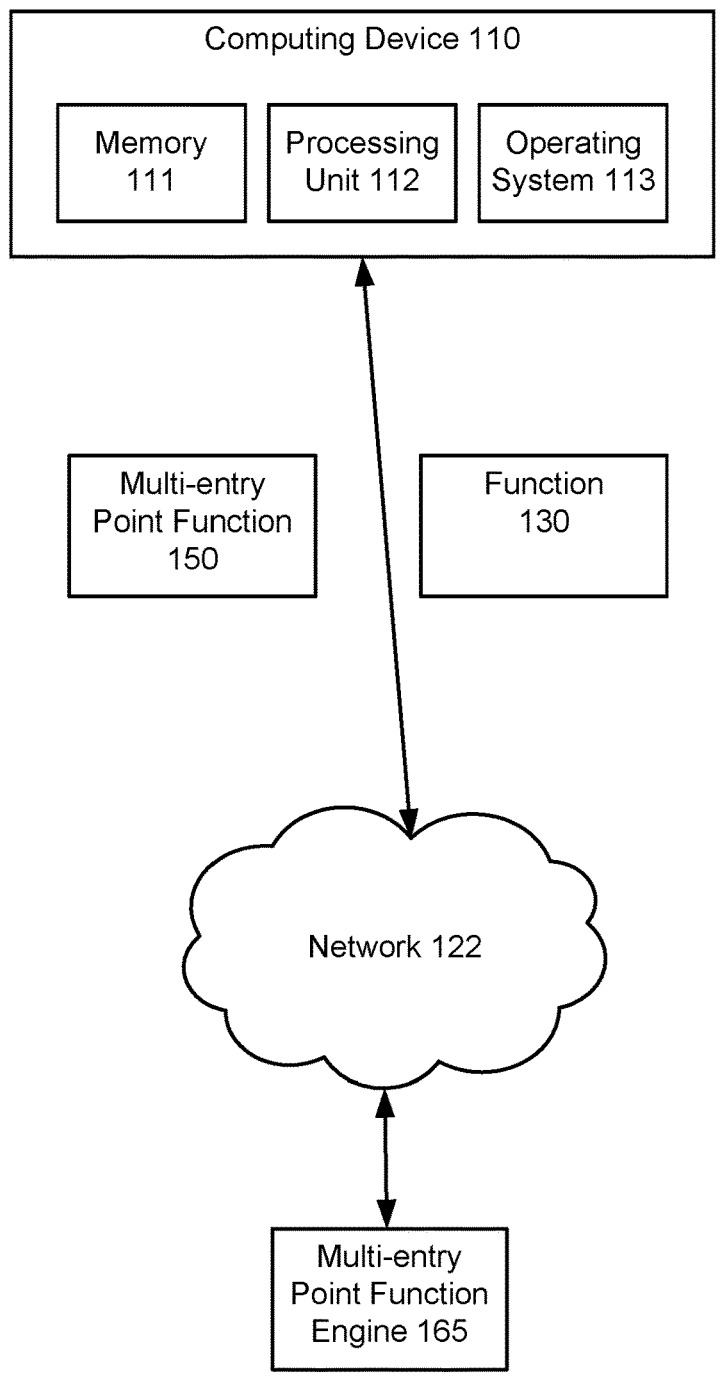
FIG. 1 is an illustration of an exemplary environment for generating and using multi-entry point functions.

FIG. 1 is an illustration of an exemplary environment 100 for generating and using multi-entry point functions 150. The environment 100 may include a computing device 110 and a multi-entry point function engine 165 in communication through a network 122. The network 122 may be a variety of network types including the public switched telephone network (PSTN), a cellular telephone network, and a packet switched network (e.g., the Internet). Although only one computing device 110 and one multi-entry point function engine 165 are shown in FIG. 1, there is no limit to the number of computing devices 110 and multi-entry point function engines 165 that may be supported.

Figure 5:
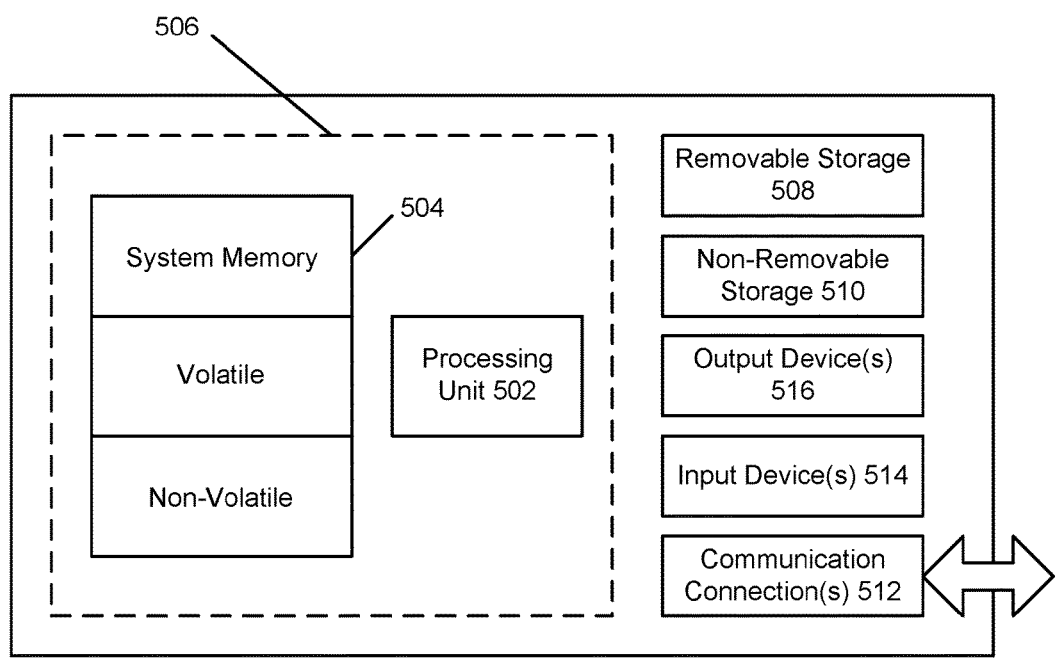
FIG. 5 shows an exemplary computing environment in which example embodiments and aspects may be implemented.

The computing device 110 and the multi-entry point function engine 165 may be implemented using a variety of computing devices such as smart phones, desktop computers, laptop computers, tablets, and video game consoles. Other types of computing devices may be supported. A suitable computing device is illustrated in FIG. 5 as the computing device 500.

The computing device 110 may include a memory 111 and a processing unit 112. The memory 111 may include a combination of volatile and non-volatile memory and may be accessible to the processing unit 112. The processing unit 112 may read and write data to and from the memory 111. The processing unit 112 may include one or more microprocessors.

The computing device 110 may further include one or more operating systems 113. The operating system 113 may be executed by the processing unit 112 and may reside in the memory 111. The operating system 113 may control and/or manage the processing unit 112 and the memory 111.

The operating system 113 may schedule the execution of one or more functions 130 by the processing unit 112. The functions 130 may perform a variety of services and actions for the computing device 110. The functions 130 may be part of applications such as word processing applications, e-mail or other communication applications, and even the operating system 113. Any type of function 130 may be supported.

In some implementations, the functions 130 may be single-entry point functions. Each function 130 may include a series of instructions, with each instruction having a location or address in the function 130. The processing unit 112 may begin executing the function 130 starting at the instruction associated with the first address or location in the function 130.

Generally, each function 130 may include three components: a prologue, a functional component, and an epilogue. The prologue of the function 130 may set up a stack frame for the function 130 to use, and may initialize one or more local variables in the stack frame. The functional component may include the logic or actions that are performed by the function 130, and may use the local variables and/or stack frame set up by the prologue. The epilogue may clean up the stack frame including any initialized local variables.

As may be appreciated, because of the sequential nature of the single entry point function 130 (i.e., prologue, functional component, and epilogue), the function 130 may only be executed starting from the first instruction of the prologue. For example, if the function 130 were executed stating from a different instruction (e.g., by setting an instruction pointer to an address or label of the different instruction), the function 130 would behave unpredictably or would likely crash.

In order to provide a static function that can support multiple entry points, the environment 100 may include the multi-entry point function engine 165 that may generate one or more multi-entry point functions 150. As described further with respect to FIG. 2, a multi-entry point function 150 may be similar in structure to the function 130, but with the addition of a plurality of entry points. The multi-entry point function 150 may be entered from any one of the plurality of entry points, and the actions or steps that are performed by the functional component of the multi-entry point function 150 may change depending on which entry point was used. In addition, the prologue and epilogue of the multi-entry point function 150 may be executed in their entirety regardless of the entry point that is used to enter the multi-entry point function 150.

Because no instructions of the prologue are skipped, the multi-entry point function 150 remains stable regardless of the entry point that is used. Moreover, because the multi-entry point function 150 uses static code, it avoids the stability issues and resource requirements associated with dynamic code.

Figure 2:
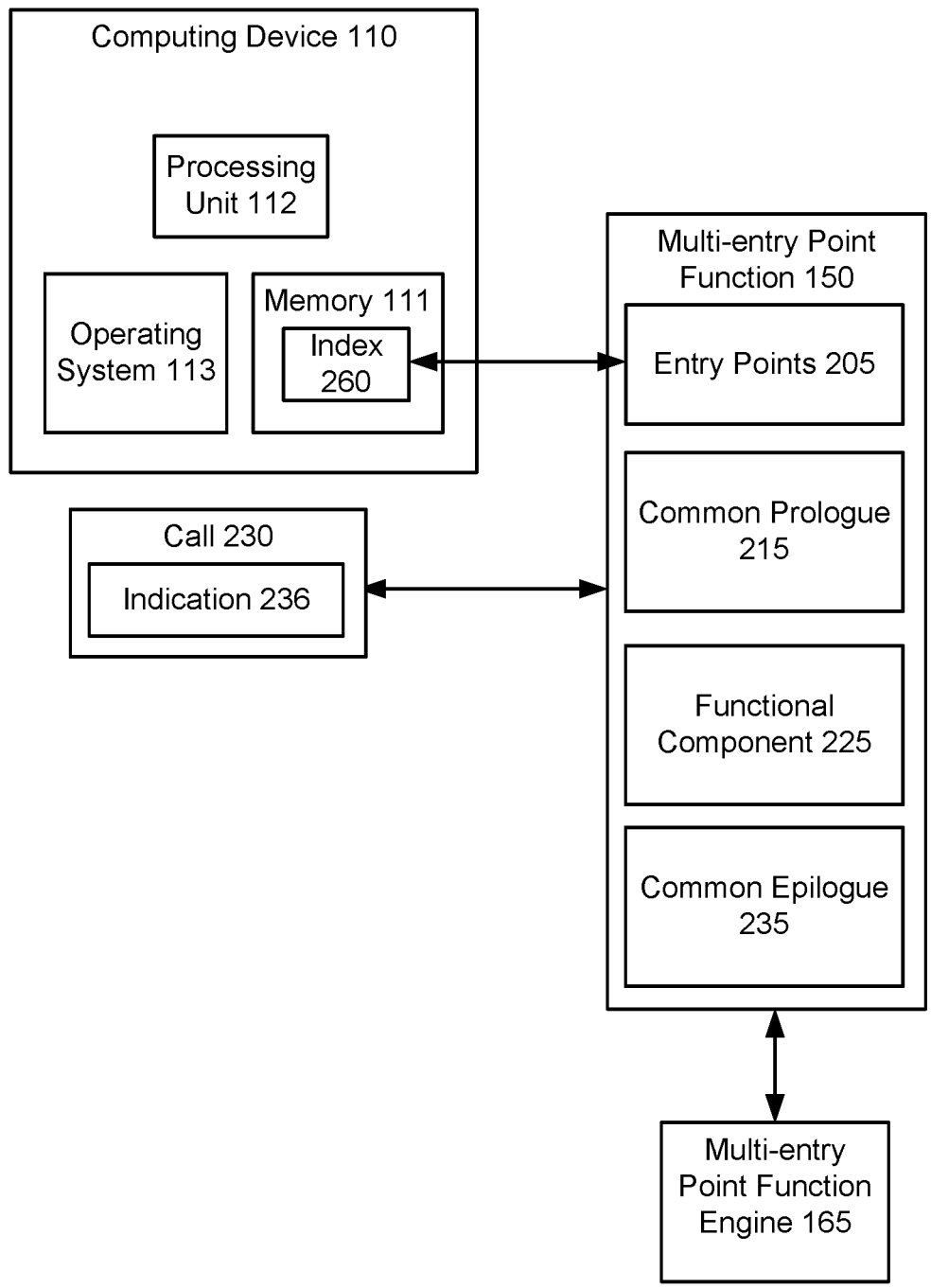
FIG. 2 is an illustration of an implementation of an example multi-entry point function.

FIG. 2 is an illustration of an implementation of an example multi-entry point function 150. As shown, the multi-entry point function 150 includes one or more components including entry points 205, a common prologue 215, a functional component 225, and a common epilogue 235. More or fewer components may be included in the multi-entry point function 150. Some or all of the components of the multi-entry point function 150 may be generated by the multi-entry point function engine 165.

Depending on the implementation, each of the components of the multi-entry point function 150 may include a plurality of instructions and each instruction may have an address or label. Typically, the instructions of each component are performed in order by the processing unit 112 of the computing device 110 unless the instruction is a jump instruction that indicates an address or label of another instruction in the component or in a different component. In the event of a jump instruction, the processing unit 112 of the computing device 110 may move the instruction pointer to the instruction indicated by the jump instruction, and may begin executing instructions starting from the instruction indicated by the jump instruction.

Each entry point 205 may be an array or other data structure that includes a plurality of instructions for the entry point 205. Each entry point 205 may further be associated with an offset or address of where the first instruction of the entry point 205 is located. To enter the multi-entry point function 150 at a particular entry point 205, the processing unit 112 of the computing device 110 may set the instruction pointer using the address or offset associated with the entry point 205. The processing unit 112 of the computing device 110 may begin executing the multi-entry point function 150 starting at the instruction indicated by the offset.

The multi-entry point function 150 may be associated with an index 260. The index 260 may be a data structure that includes data for each entry point 205 associated with the multi-entry point function 150. In some implementations, the index 260 may include an element for each entry point 205 associated with the multi-entry point function 150. The element for an entry point 205 may include the various variables and data structures that cause the functional component 225 to perform the various actions that are associated with the entry point 205 of the multi-entry point function 150.

In some implementations, each entry point 205 may include an instruction to cause the processing unit 112 to save an identifier or other value associated with the entry point 205 in a register. The value in the register may be used by the common prologue 215 to determine which entry point 205 was used to enter the multi-entry point function 150. In some implementations, the instruction may be an instruction to move the value associated with the entry point 205 to a predetermined general purpose register. Other types of instructions may be used.

In addition, each entry point 205 may include an instruction to move to an instruction associated with the common prologue 215. The instruction may be a jump instruction and may include the address or label associated with the common prologue 215. Other types of instructions may be used.

In order to allow the multi-entry point function 150 to work where no particular entry point 205 is indicated, such as when the multi-entry-point function 150 is called by a scanner, the first entry point 205 may be a default entry point 205 that will be used when no entry point 205 is indicated or when no offset is provided. Because the instructions of the first entry point 205 are the first instructions in the multi-entry point function 150, any function 130 that calls the multi-entry point function 150 will start executing the function 150 at the first entry point 205. Accordingly, to the calling function 130, the multi-entry point function 150 will behave as a normal single-entry point function 130.

Example assembly language code for two entry points 205 is provided below:

```
FUNC_ENTRY_POINT(0)
    012D16E0 mov eax,0
    012D16E5 jmp _commonPrologue (012D181Eh)
    012D16EA nop
    012D16EB nop
FUNC_ENTRY_POINT(1)
    012D16EC mov eax,1
    012D16F1 jmp _commonPrologue (012D181Eh)
    012D16F6 nop
    012D16F7 nop
```

As can be seen above, the entry points 205 include a first entry point 205 called "FUNC_ENTRY_POINT(0)." This is the first or default entry point 205 for a calling function 130 that does not indicate which entry point 205 that they would like to use to enter the multi-entry point function 150. Each instruction is proceeded by an address. This entry point 205 include an instruction to move (i.e., "mov") the value 0 associated with the entry point 205 into the general purpose register "eax". This entry point 205 further includes an instruction to move the instruction pointer to an address associated with the common prologue 215 (i.e., "jmp_commonPrologue (012D181Eh)).

The entry points 205 further include a second entry point 205 called "FUNC_ENTRY_POINT(1)." This entry point 205 is used by a calling function 130 that indicates the second entry point 205 or that provides an offset to the instruction at the address 012D16EC (i.e., the first instruction in the entry point 205). This entry point 205 includes an instruction to move (i.e., "mov") the value 1 associated with the entry point 205 into the general purpose register "eax". This entry point 205 further includes the same instruction to move the instruction pointer to the address associated with the common prologue 215 (i.e., "jmp_commonPrologue (012D181Eh)).

The common prologue 215 may include instructions that are executed regardless of which entry point 205 was used to enter the multi-entry point function 150. In some implementations, the common prologue 215 may set up the stack frame and one or more local variables.

The common prologue 215 may further determine the entry point 205 that was used to enter the multi-entry point function 150. In some implementations, the common prologue 215 may determine the entry point 205 by reading the value stored in the general purpose register by the entry point 205 (i.e., the "eax" register).

After determining the entry point 205, the common prologue 215 may retrieve the data from the element of the index 260 associated with the determined entry point 205. The received data may be stored in one or more variables and/or registers for use by the functional component 225.

Alternatively, rather than retrieve the data from the index 260, the common prologue 215 may make an identifier of the entry point 205 that was used to call the multi-entry point function 150 available to the functional component 225. Example assembly language code for the common prologue 215 is provided below:

```
_commonPrologue:
    012D181E push ebp
    012D181F mov ebp,esp
    012D1821 push ebx
    012D1822 push ecx
    012D1823 push edx
    012D1824 push esi
    012D1825 push edi
    012D1826 push eax
```

In the example shown above, the common prologue 215 include instructions 012D181E-012D1825 that are directed to setting up the stack frame for the functional component 225. The final instruction of the common prologue 215 includes the instruction "push eax" that pushes the value contained in the general purpose register "eax" to the stack frame. In the example code for entry points 205, the identifier of the entry point 205 that was used to enter the multi-entry point function 150 was moved into the same general purpose register "eax." Accordingly, the identifier of the entry point 205 is now available to the functional component 225 on the stack frame.

The functional component 225 may perform one or more actions based on the entry point 205 that was used to enter the multi-entry point function 150. In particular, the functional component 225 may use the various variables and data structures from the element of the index 260 associated with the entry point 205 that was used to enter the multi-entry point function 150. In some implementations, the various variables and data structures may have been retrieved for the functional component 225 by the common prologue 215.

In other implementations, the functional component 225 may determine the entry point 205 that was used to enter the multi-entry point function 150 based on the value of the "eax" register passed to the functional component 225 by the common prologue 215 on the stack frame. The functional component 225 may retrieve the various variables and data structures associated with the entry point 205 from the index 260.

The functional component 225 may determine the entry point 205 used to enter the multi-entry point function 150, and may perform instructions that correspond to the entry point 205. For example, the functional component 225 may include a set of instructions for each entry point 205, and some conditional instructions (e.g., if, while, etc.) that selectively execute one or more sets of instructions based on the entry point 205 that was used to enter the multi-entry point function 150.

The common epilogue 235 may directly follow the end of the functional component 225. After the processing unit 112 of the computing device 110 processes the last instruction of the functional component 225, the processing unit 112 may begin processing instructions of the common epilogue 235. The common epilogue 235 may include instructions to clean up the stack frame that was created by the common prologue 215, and to return any values that were generated by executing the functional component 225. The common epilogue 235 may not include any instructions that depend on which entry point 205 was used to enter the multi-entry point function 150.

The multi-entry point function 150 may be invoked using a call 230. The call 230 may be generated by a user associated with the computing device 110, the operating system 113, and one or more functions 130.

The call 230 may further include an indication 236. The indication 236 may indicate which entry point 205 of the plurality of entry points 205 is to be used to enter the multi-entry point function 150. Depending on the implementation, the indication 236 may be an offset or an indication of the address of the first instruction of the desired entry point 205. Where no indication 236 is included in the call 230, the multi-entry point function 150 may be entered at the first entry point 205, which is also the first instruction in the multi-entry point function 150.

Using a multi-entry-point function 150 as described above provides many advantages. First, because the multi-entry point function 150 is static, rather than dynamic, a computing system using the static multi-entry point function 150 may use less resources than a computing system using a dynamic function that performs the same functionality. In addition, the static multi-entry point function 150 can be optimized at compile time which offers performance benefits over dynamic functions that are optimized at run time.

Second, the multi-entry-point function 150 allows a single function to perform a variety of actions and tasks based on the caller of the function 150. For example, a user may desire to implement a multi-entry point function 150 that monitors a variety of functions 130. The user may create an entry point 205 for each of the functions 130 that the user desires to monitor. For each entry point 205 and function 130, the user may create a corresponding element in the index 260. Each element may include data that causes the functional component 225 to perform different actions depending on what entry point 205 was used to enter the multi-entry point function 150. Similarly, the static multi-entry point function 150 may allow a programmer to create a single function that can be used on multiple architectures without additional programming.

The user may add a call 230 to the multi-entry point function 150 to each of the functions 130 that are being monitored. Each call 230 may include an indication 236 that indicates the entry point 205 that was created for that function 130. In that way, the actions that are performed by the functional component 225 may be different depending on the function 130 that calls the multi-entry point function 150.

In another example, a user may use a single multi-point function 150 to support a variety of computer architectures. For example, the user may make an entry point 205 for each architecture that the user desires the multi-entry point function 150 to support. The index 260 may include data such as definitions and data structures that are specific to each architecture. The functional component 225 may include instructions for one computer architecture (e.g., x86 or amd64), and the instructions may behave differently based on a current architecture (i.e., the architecture used by the calling function). When a user of a supported architecture generates a call 230 for the multi-entry point function 150, they may include the indication 236 of the entry point 205 for their specific architecture.

In some implementations, the multi-entry point function engine 165 can generate the multi-entry point function 150 using one or more templates. For example, each template may correspond to a different architecture. The programmer may generate code for a single architecture, and the multi-entry point function engine 165 may generate a functional component 225 that includes code for each of one or more selected architectures based on the code and the templates.

Figure 3:
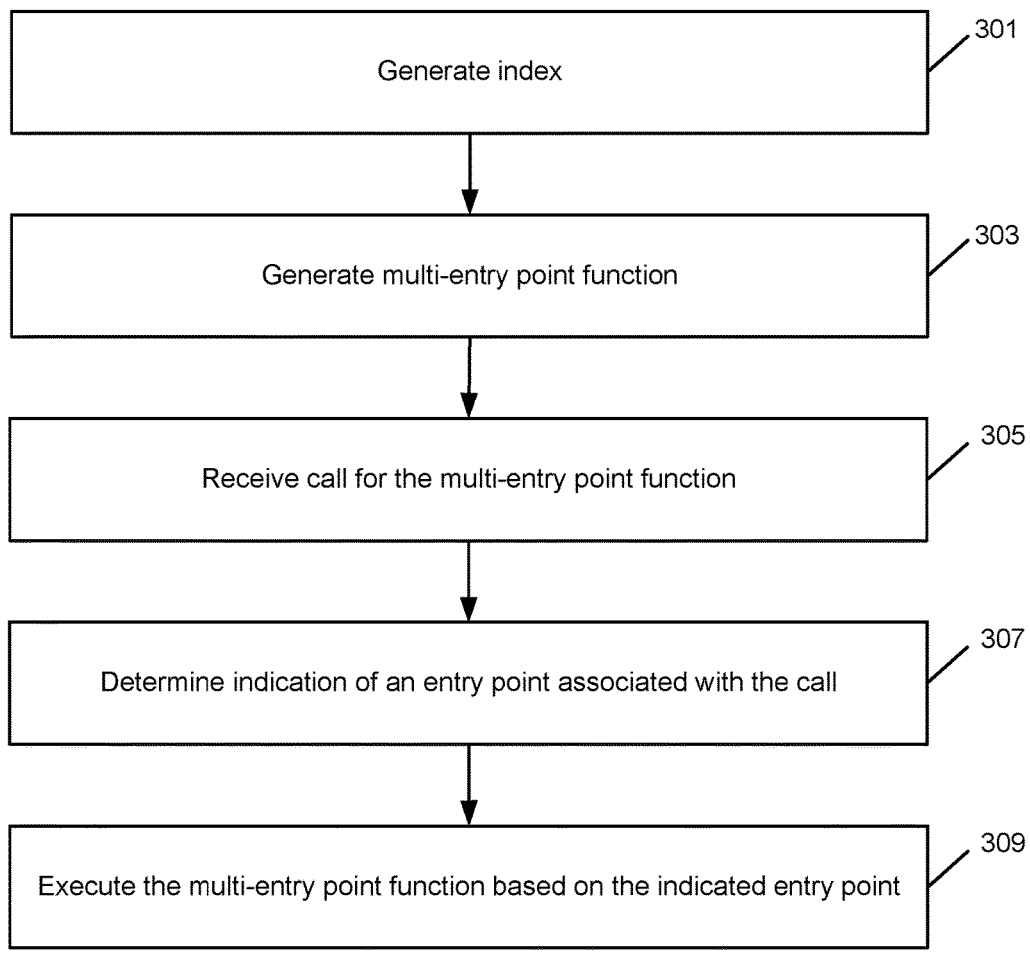
FIG. 3 is an operational flow of an implementation of a method for generating and executing a multi-entry point function.

FIG. 3 is an operational flow of an implementation of a method 300 for generating and executing a multi-entry point function 150. The method 300 may be implemented by one or more of the multi-entry point function engine 165 and the computing device 110.

At 301, an index is generated. The index 260 may be generated by the multi-entry point function engine 165. The index 260 may include a plurality of elements and each element may be associated with an entry point 205 of a multi-entry point function 150. Each element may include data for the functional component 225 corresponding to the entry point 205. The data may include local variables for the functional component 225 corresponding to the entry point 205. The generated index 260 may be stored by the multi-entry point function engine 165 in the memory 111 of the computing device 110.

At 303, a multi-entry point function is generated. The multi-entry point function 150 may be generated by the multi-entry point function engine 165. The multi-entry point function 150 may include a plurality of entry points 205, with some or all of the entry points 205 corresponding to an element of the index 206. Each entry point 205 may be associated with a different memory offset in the multi-entry point function 150. Each entry point 205 may include an instruction to jump to an instruction of a common prologue 215 of the multi-entry point function 150, and an instruction to store an identifier of the entry point 205 in a common register.

The common prologue 215 may set up the stack frame for the multi-entry function 150, and may include an instruction to read the identifier of the entry point 205 from the common register and to push the identifier onto the stack frame. Depending on the implementation, the common prologue 215 may further include instructions to read the data from the element of the index 260 associated with the identified entry point 205, and to make the data available to a functional component of the multi-entry function 150 on the stack frame.

The functional component 225 may determine which entry point 205 was used to enter the multi-entry point function 150, and may perform different actions or instructions based on which entry point 205 was used. Depending on the implementation, the functional component 225 may determine the entry point 205 that was used based on the identifier of the entry point 205 that was added to the stack frame by the common prologue 215 or based on the data from the index 260.

At 305, a call for a multi-entry point function is received. The call 230 may be received by the processing unit 112 of the computing device 110. The call 230 may be made by a function 130, or may be made by an application.

At 307, an indication of an entry point associated with the call is determined. The indication 236 of an entry point 205 may be determined by the processing unit 112 of the computing device 110. The indication 236 may be a memory offset and may identify the first instruction of the entry point 205 associated with the call 230.

At 309, the multi-entry point function is executed based on the indicated entry point. The multi-entry point function 150 may be executed by the processing unit 112 of the computing device 110. Depending on the implementation, the multi-entry point function 150 may be executed by setting an instruction pointer to the instruction indicated by the indication 236 (i.e., the memory offset).

Figure 4:
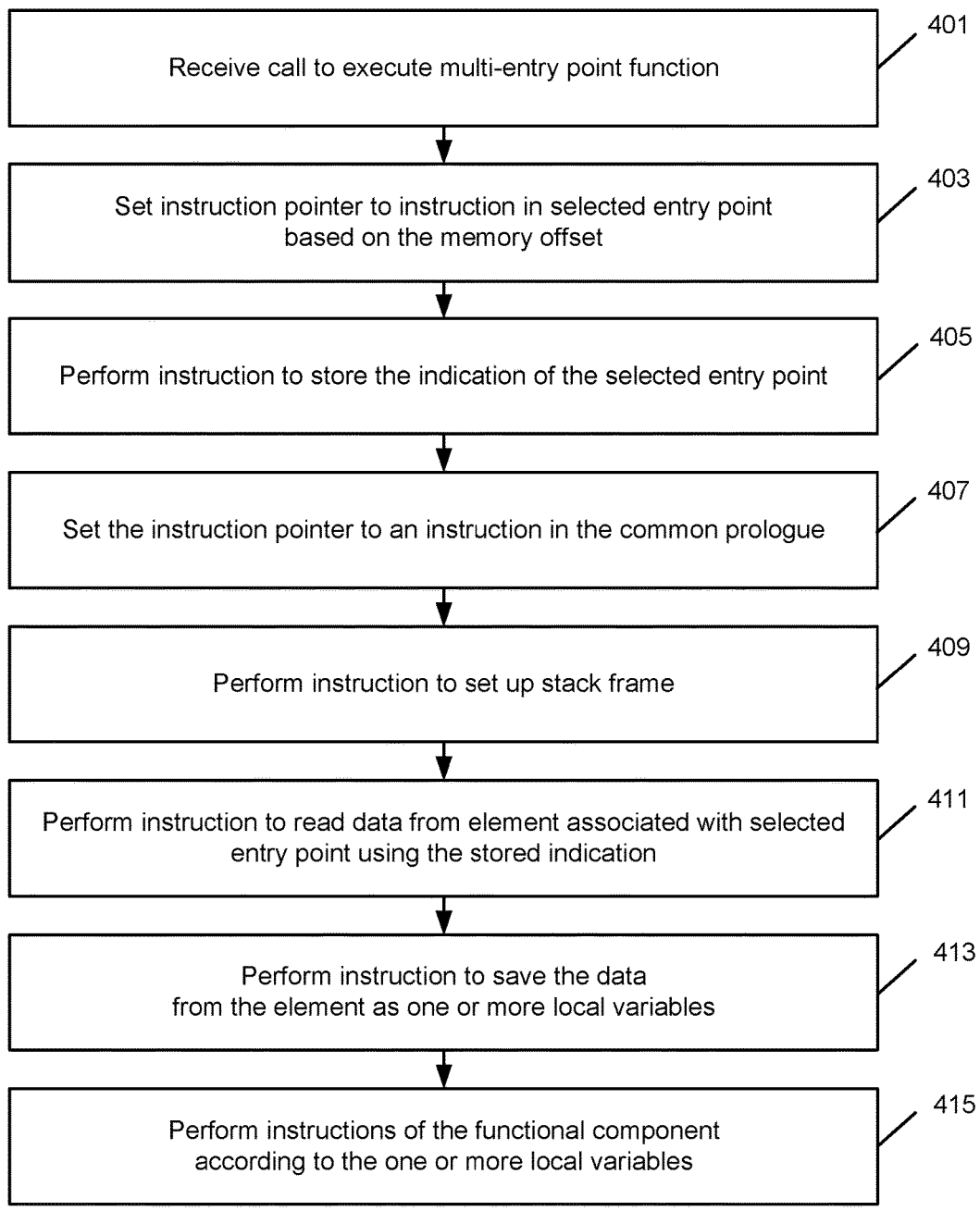
FIG. 4 is an operational flow of an implementation of a method for executing a multi-entry point function.

FIG. 4 is an operational flow of an implementation of a method 400 for executing a multi-entry point function 150. The method 400 may be implemented by the computing device 110 and/or the multi-entry point function engine 165.

At 401, a call to execute a multi-entry point function is received. The call 230 may be received by the processing unit 112 of the computing device 110 from the operating system 113. The call 230 may further include an indication 236 of an entry point 205 of a plurality of entry points 205 of the multi-entry point function 150. The indication 236 may correspond to a memory offset.

At 403, an instruction pointer is set to an instruction in a selected entry point based on the memory offset. The instruction pointer may be set by the processing unit 112 of the computing device 110. The instruction pointer may be set to an instruction of the entry point 205 that corresponds to the memory offset.

At 405, an instruction to store the indication of the selected entry point is performed. The instruction may be performed by the processing unit 112 of the computing device 110. The instruction may be part of the selected entry point 205 and may be an instruction to store the identifier 236 in a common register of the processing unit 112. The stored identifier 236 may be used by one or both of the common prologue 215 and the functional component 225 to determine which entry point 205 was used to enter or call the multi-entry point function 150.

At 407, the instruction pointer is set to an instruction in the common prologue. The instruction pointer may be set by the processing unit 112 of the computing device 110. The instruction pointer may be set to a first instruction of the common prologue 215. The instruction pointer may be set in response to a jump instruction in the selected entry point 205.

At 409, an instruction to set up a stack frame is performed. The instruction may be performed by the processing unit 112 of the computing device 110. The instruction may be part of the common prologue 215.

At 411, an instruction to read data from an element associated with the selected entry point is performed. The instruction may be performed by the processing unit 112 of the computing device 110. The element may be part of the index 260 and memory 111 and may contain data for one or more local variables associated with the selected entry point 205.

In some implementations, the data may be read according to instructions in the common prologue 215 and may be added to the stack frame for processing by the functional component 225. Alternatively, the data may be read according to instructions in the functional component 225.

At 413, an instruction to save the data from the element as one or more local variables is performed. The instruction may be performed by the processing unit 112 of the computing device 110. Depending on the implementation, the instruction may be part of the common prologue 215 or the functional component 225.

At 415, instructions of the functional component are performed according to the one or more local variables. The instructions may be performed by the processing unit 112 of the computing device 110. The instructions that are performed may correspond to the entry point 205 that was used to enter or call the multi-point entry function 150.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for providing a multi-entry point function is provided. The system includes at least one computing device; and a multi-entry point function engine. The multi-entry point function engine is adapted to: generate a multi-entry point function, wherein the multi-entry point function comprises: a plurality of entry points wherein each entry point is associated with data; and a functional component that performs one or more actions based on the data associated with a selected entry point of the plurality of entry points; receive a call for the multi-entry point function, the call associated with an indication of an entry point of the plurality of entry points; and execute the generated multi-entry point function based on the indicated entry point.

Implementations may include some or all of the following features. The system may further include an index stored in memory of the at least one computing device. The index may include a plurality of elements, and the data associated with each entry point may include an element of the plurality of elements. Each entry point may include an instruction to identify the element of the plurality of elements of the index that is associated with the entry point. The multi-entry point function may include a common prologue, and the common prologue may include an instruction to read data from the identified element of the index, and to save the data as one or more local variables. The functional component may perform the one or more actions based on the data from the one or more local variables. The indication of an entry point may include an offset, and each entry point of the plurality of entry points may be associated with a different offset. The function may further include a common prologue and a common epilogue. Each entry point may include an instruction to jump to the common prologue. The multi-entry point function may be a function to monitor a plurality of functions, and each entry point is associated with a different function of the plurality of functions.

In an implementation, a system for providing a multi-entry point function is provided. The system includes at least one computing device and a multi-entry point function engine. The multi-entry point function is adapted to: generate an index, wherein the index comprises a plurality of elements; and generate a multi-entry point function, wherein the multi-entry point function comprises: a plurality of entry points, wherein each entry point is associated with an element of the plurality of elements of the index; a common prologue that comprises: an instruction that creates a stack frame for the multi-entry point function; and an instruction that saves an identifier of a selected entry point of the plurality of entry points to the stack frame; and a functional component that comprises: an instruction to determine the selected entry point based on the identifier; an instruction to save the data from the element associated with the selected entry point as one or more local variables; and an instruction to perform one or more actions based on the data from the one or more local variable.

Implementations may include some or all of the following features. The multi-entry point function may be optimized at compile time. Each entry point may include an instruction to jump to the common prologue. The multi-entry point function engine may be further adapted to: receive a call for the multi-entry point function, the call associated with an indication of an entry point of the plurality of entry points; and execute the generated multi-entry point function based on the indicated entry point. The indication of an entry point may include an offset, and each entry point of the plurality of entry points may be associated with a different offset. The multi-entry point function may support a plurality of computer architectures, and the multi-entry point function engine may be further adapted to: receive a plurality of templates, wherein each template corresponds to a different computer architecture of the plurality of architectures; and generate the functional component using the plurality of templates.

In an implementation, a method for executing a multi-entry point function is provided. The method includes: receiving a call for a multi-entry point function by a computing device, wherein the multi-entry point function comprises: a plurality of entry points, wherein each entry point is associated with an element of a plurality of elements of an index; a common prologue that comprises: an instruction to read data from the element associated with a selected entry point of the plurality of entry points; and an instruction to save the data from the element associated with the selected entry point as one or more local variables; and a functional component that comprises an instruction to perform one or more actions based on the data from the one or more local variables; determining an offset associated with the call by the computing device; and executing the generated multi-entry point function based on the determined offset by the computing device.

Implementations may include some or all of the following features. Executing the generated multi-entry point function based on the determined offset may include setting an instruction pointer to an instruction in the selected entry point based on the memory offset. The method may further include: performing an instruction to store an indication of the selected entry point; and performing an instruction to set the instruction pointer to an instruction in the common prologue. The method may further include: performing the instruction to read the data from the element associated with the selected entry point using the stored indication of the selected entry point; and performing the instruction to save the data from the element associated with the selected entry point as the one or more local variables. The multi-entry point function may be a function to monitor a plurality of functions, and each entry point may be associated with a different function of the plurality of functions.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment.

Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for providing a multi-entry point function comprising:
   at least one computing device comprising a processing unit configured to:
      generate a static multi-entry point function that uses static code, with the static code having been generated at a compile time that is prior to a run time of the static multi-entry point function, wherein the static multi-entry point function allows callers to enter the function at different entry points using a respective offset of a plurality of offsets, wherein each of the different entry points is associated with a different offset of the plurality of offsets, and wherein the static multi-entry point function comprises:
         the different entry points wherein each entry point of the different entry points is associated with data;
         a common prologue, with each entry point of the different entry points comprising an instruction to jump to the common prologue; and
         a functional component that performs one or more actions based on the data associated with a selected entry point of the different entry points;
      receive a call for the static multi-entry point function, the call associated with an indication of an entry point of the different entry points; and
      execute the generated static multi-entry point function based on the indicated entry point; and
   a memory.

2. The system of claim 1, further comprising an index stored in memory of the at least one computing device, wherein the index includes a plurality of elements, and the data associated with each entry point comprises an element of the plurality of elements.

3. The system of claim 2, wherein each entry point of the different entry points comprises an instruction to identify the element of the plurality of elements of the index that is associated with the entry point.

4. The system of claim 3, wherein the common prologue includes an instruction to read data from the identified element of the index, and to save the data as one or more local variables.

5. The system of claim 4, wherein the functional component further performs the one or more actions based on the data from the one or more local variables.

6. The system of claim 1, wherein the function further comprises a a common epilogue.

7. The system of claim 1, wherein the static multi-entry point function is a function to monitor a plurality of functions, and each entry point of the different entry points is associated with a different function of the plurality of functions.

8. The system of claim 1, wherein the processing unit is configured to determine an offset associated with the call, and wherein the executing of the generated static multi-entry point function is based on the determined offset.

9. A system for providing a multi-entry point function comprising:
   at least one computing device comprising a processing unit configured to:
      generate an index, wherein the index comprises a plurality of elements; and
      generate a static multi-entry point function that uses static code, with the static code having been generated at a compile time that is prior to a run time of the static multi-entry point function, wherein the static multi-entry point function allows callers to enter the function at different entry points using a respective offset of a plurality of offsets, wherein each of the different entry points is associated with a different offset of the plurality of offsets, and wherein the static multi-entry point function comprises:
         a different entry points, wherein each entry point of the different entry points is associated with an element of the plurality of elements of the index;
         a common prologue, with each entry point of the different entry points comprising an instruction to jump to the common prologue, and with the common prologue comprising:
            an instruction that creates a stack frame for the static multi-entry point function; and
            an instruction that saves an identifier of a selected entry point to the stack frame; and
         a functional component that comprises:
            an instruction to determine the selected entry point based on the identifier;
            an instruction to save data from the element associated with the selected entry point as one or more local variables; and
            an instruction to perform one or more actions based on the data from the one or more local variables; and
   a memory.

10. The system of claim 9, wherein the static multi-entry point function is optimized at compile time.

11. The system of claim 9, wherein the processing unit is further configured to:
   receive a call for the static multi-entry point function, the call associated with an indication of an entry point of the different entry points; and
   execute the generated static multi-entry point function based on the indicated entry point.

12. The system of claim 9, wherein the static multi-entry point function supports a plurality of computer architectures, and the processing unit is further configured to:
   receive a plurality of templates, wherein each template corresponds to a different computer architecture of the plurality of architectures; and
   generate the functional component using the plurality of templates.

13. The system of claim 11, wherein the processing unit is configured to determine an offset associated with the call, and wherein the executing of the generated static multi-entry point function is based on the determined offset.

14. A method for executing a multi-entry point function comprising:
   receiving a call for a static multi-entry point function by a computing device, wherein the static multi-entry point function uses static code and allows callers to enter the function at different entry points using a respective offset of a plurality of offsets, with the static code having been generated at a compile time that is prior to a run time of the static multi-entry point function, wherein each of the different entry points is associated with a different offset of the plurality of offsets, and wherein the static multi-entry point function comprises:
- a different entry points, wherein each entry point of the different entry points is associated with an element of a plurality of elements of an index;
- a common prologue, with each entry point of the different entry points comprising an instruction to jump to the common prologue; and
- a functional component that comprises an instruction to perform one or more actions;

determining an offset associated with the call by the computing device; and executing the static multi-entry point function based on the determined offset by the computing device.

15. The method of claim 14, wherein executing the static multi-entry point function based on the determined offset comprises setting an instruction pointer to an instruction in a selected entry point of the different entry points based on the determined offset.

16. The method of claim 15, further comprising:
performing an instruction to store an indication of the selected entry point; and
performing an instruction to set the instruction pointer to an instruction in the common prologue.

17. The method of claim 14, wherein the static multi-entry point function is a function to monitor a plurality of functions, and each entry point of the different entry points is associated with a different function of the plurality of functions.

18. The method of claim 14, wherein the common prologue comprises an instruction to read data from the element associated with a selected entry point of the different entry points.

19. The method of claim 18, wherein the common prologue further comprises an instruction to save the data from the element associated with the selected entry point as one or more local variables, and wherein the instruction to perform one or more actions comprises an instruction to perform one or more action based on the data from the one or more local variables.

20. The method of claim 19, further comprising:
performing the instruction to read the data from the element associated with the selected entry point using a stored indication of the selected entry point; and
performing the instruction to save the data from the element associated with the selected entry point as the one or more local variables.

* * * * *